US006775826B1

(12) United States Patent
Zahavi et al.

(10) Patent No.: US 6,775,826 B1
(45) Date of Patent: Aug. 10, 2004

(54) SYSTEM AND METHOD FOR REPLAYING WORKLOAD DATA IN A DATA STORAGE ENVIRONMENT

(75) Inventors: William Zahavi, Westborough, MA (US); Kenneth R. Coguen, Berlin, MA (US); Paul F. Hale, Hudson, MA (US); Andrew M. Shooman, Sharon, MA (US); Yeshayahu Hass, Hon-Hasharon (IL)

(73) Assignee: EMC Corporation, Hopkinton, MA (US)

( * ) Notice: Subject to any disclaimer, the term of this patent is extended or adjusted under 35 U.S.C. 154(b) by 35 days.

(21) Appl. No.: 10/180,849

(22) Filed: Jun. 26, 2002

Related U.S. Application Data

(63) Continuation-in-part of application No. 09/794,696, filed on Feb. 26, 2001.

(51) Int. Cl.[7] ................................................ G06F 11/30
(52) U.S. Cl. ......................... 717/128; 710/18; 714/45; 711/162
(58) Field of Search ................................. 717/124, 128; 711/162; 710/18; 714/39, 45

(56) References Cited

U.S. PATENT DOCUMENTS

| 5,560,036 A | * | 9/1996 | Yoshida |
| 6,101,497 A | * | 8/2000 | Ofek |
| 2003/0088854 A1 | * | 5/2003 | Wygodny et al. |

FOREIGN PATENT DOCUMENTS

| JP | Hei 2-201552 | * | 8/1990 |
| JP | 5-257758 A | * | 8/1993 |
| JP | 6-28268 A | * | 4/1994 |
| JP | 6-266630 A | * | 9/1994 |

* cited by examiner

*Primary Examiner*—Jack A. Lane
(74) *Attorney, Agent, or Firm*—Robert Kevin Perkins; Leanne J. Fitzgerald; John M. Gunther

(57) ABSTRACT

This invention is a system and method for replaying workload data that may be accessed in a data storage environment and then replayed for testing or other reasons. The invention has the capability to extract a trace of all I/Os to a data storage system for an extended period of time and then replay these I/Os back to that or another system. Variables may also be manipulated though the play back system to increase testing flexibility at a lower cost than actually introducing new physical variables.

10 Claims, 10 Drawing Sheets

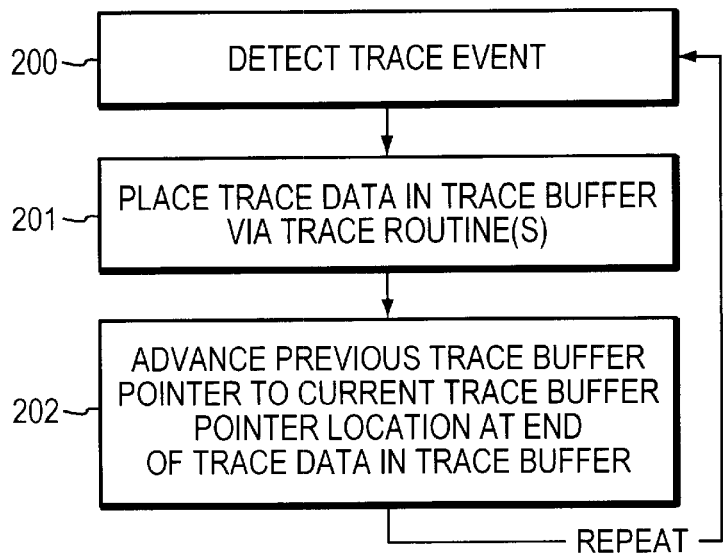
FIG. 3A  TRACE BUFFER OPERATION
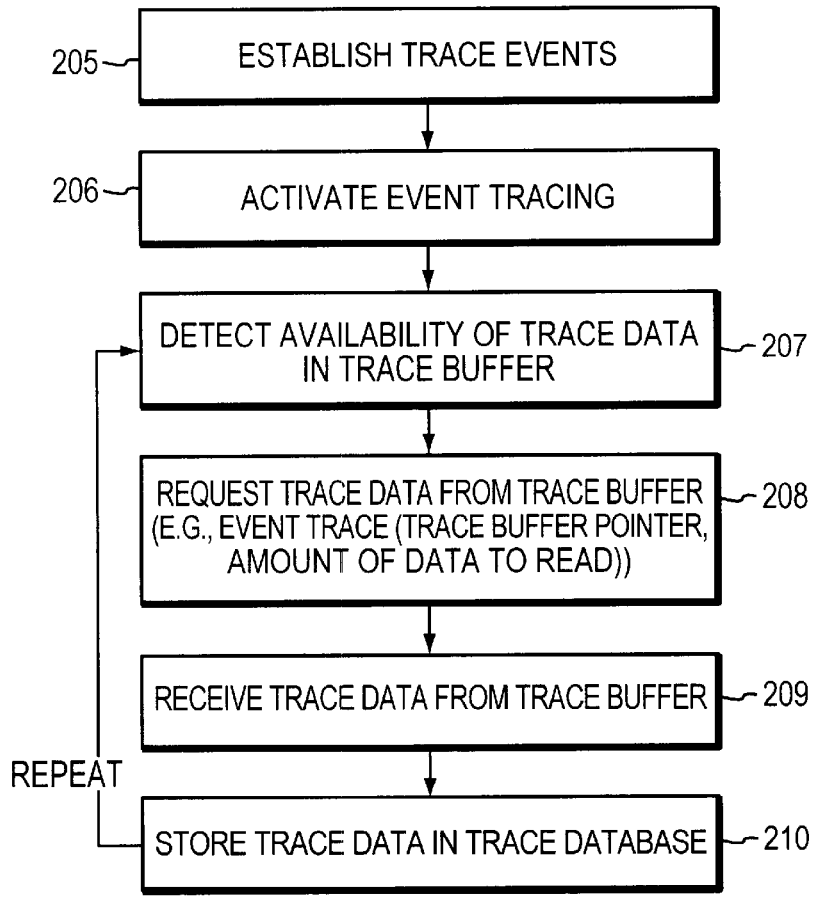
FIG. 3B  TRACE CAPTURE PROCESS OPERATION

FIG. 5 TRACE CAPTURE PROCESS OPERATION

FIG. 6  EVENT TRACE OPERATION

| TIME STAMP | PORT A DIRECTOR 155 | PORT B DIRECTOR 155 | PORT A DIRECTOR 157 | PORT B DIRECTOR 157 |
|---|---|---|---|---|
| $t_0$ | $I/O_0(A\text{-}155)$ | $I/O_0(B\text{-}155)$ | $I/O_0(A\text{-}157)$ | $I/O_0(B\text{-}157)$ |
| $t_i$ | $I/O_i(A\text{-}155)$ | $I/O_i(B\text{-}155)$ | $I/O_i(A\text{-}157)$ | $I/O_i(B\text{-}157)$ |
| $t_{i+1}$ | $I/O_{i+1}(A\text{-}155)$ | $I/O_{i+1}(B\text{-}155)$ | $I/O_{i+1}(A\text{-}157)$ | $I/O_{i+1}(B\text{-}157)$ |
| ⋮ | ⋮ | ⋮ | ⋮ | ⋮ |
| $t_{i+n}$ | $I/O_{i+n}(A\text{-}155)$ | $I/O_{i+n}(B\text{-}155)$ | $I/O_{i+n}(A\text{-}157)$ | $I/O_{i+n}(B\text{-}157)$ |

UNRAVELED TRACE THREAD - TABLE

FIG. 9

SYSTEM AND METHOD FOR REPLAYING WORKLOAD DATA IN A DATA STORAGE ENVIRONMENT

RELATED APPLICATIONS

This application is a continuation-in-part of U.S. patent application Ser. No. 09/794,696 entitled METHODS AND APPARATUS FOR ACCESSING TRACE DATA" to William Zahavi et al. filed Feb. 26, 2001 and claims priority to its filing date under 35 U.S.C. 120, and wherein that above-referenced application is assigned to EMC Corporation the assignee of the present application.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to systems and methods for replaying workload data produced in a data storage environment, and more particularly to a system and method that may access trace data of workload activity produced in a data storage system and then replaying the trace data for testing or other reasons.

BACKGROUND OF THE INVENTION

Testing the workload environment of a data storage environment including at least one data storage system and at least one software application operating on a host computer in communication with the data storage system is a complex task. It often requires that the business have a separate test-bed that contains a duplicate set of hardware where such tests take place. Large companies such as telecommunications companies, airlines, banks, and insurance companies routinely populate a test lab with a large amount of equipment including software applications for emulating production conditions. Other companies rely on vendors providing systems and software to run tests for them but sometimes the various vendors are unable to replicate the myriad of configurations that a particular customer may encounter within their own data storage environment.

The actual execution of application load-tests requires that a copy of the production database(s) be loaded on the storage systems and that a workload driver be created to generate either batch jobs or transactions that attempt to duplicate the production workload. Setup times and the analysis of the test results make such an effort extremely complex and limits such activities to only very few businesses that can afford the time and personnel costs.

The complexity of such a task often reduces these tests to various levels of simplicity where the results do not reflect the actual application. Furthermore, it becomes even more complicated to experiment with alternative configurations and map them onto the production system. Add to this the common requirement to see the effect of multiple applications on the same storage system and the problem is even further compounded.

Data Storage owners who try to shortcut this effort often resort to general-purpose Input/Output (I/O) drivers that are available in the marketplace. Such drivers do not attempt to duplicate an existing workload. They simply provide the user with the ability to specify a specific stream of I/Os to specific data volumes or logical devices.

It would be an advancement in the computer, and particularly the data storage arts to have a solution that could duplicate a workload in a data storage environment but would reduce the complexity of existing systems. Further, if such a solution significantly increased the accuracy and flexibility of such tests that would also be a significant advantage over prior art techniques.

SUMMARY OF THE INVENTION

To overcome the problems of the prior art and to provide advantages described above, this invention is a system and method for having a workload scenario operating in a data storage environment.

The method includes accessing a trace of workload activity experienced on one or more data storage volumes included with a first data storage system and playing a replication of the trace of workload data on one or more data storage volumes included with a second data storage system. The first and second system can be the same system, i.e., the workload activity is replayed on the same system on which it was captured. Preferably the workload activity is accessed in the form of I/O activity.

In another embodiment, a system is provided that is configured for performing the steps of accessing a trace of workload activity experienced on one or more data storage volumes included with a first data storage system and playing a replication of the trace of workload data on one or more data storage volumes included with a second data storage system.

In another embodiment, a program product is provided that is configured for performing the steps of accessing a trace of workload activity experienced on one or more data storage volumes included with a first data storage system and playing a replication of the trace of workload data on one or more data storage volumes included with a second data storage system.

BRIEF DESCRIPTION OF THE DRAWINGS

The above and further advantages of the present invention may be better under stood by referring to the following description taken into conjunction with the accompanying drawings in which:

FIG. 3A is a flow chart of processing steps that show in accordance with at least a part of an embodiment of this method how trace data is created upon occurrence of trace event(s) and how the trace data is placed into a trace buffer in the system of FIG. 1;

FIG. 3B is a flow chart of processing steps that show the operation of a Trace Capture Process configured according to embodiments of the invention;

FIG. 9 shows an example of an unraveled captured trace and its relationship with threads built for replay in the system of FIG. 1;

DETAILED DESCRIPTION OF THE PREFERRED EMBODIMENT

Figure 1:
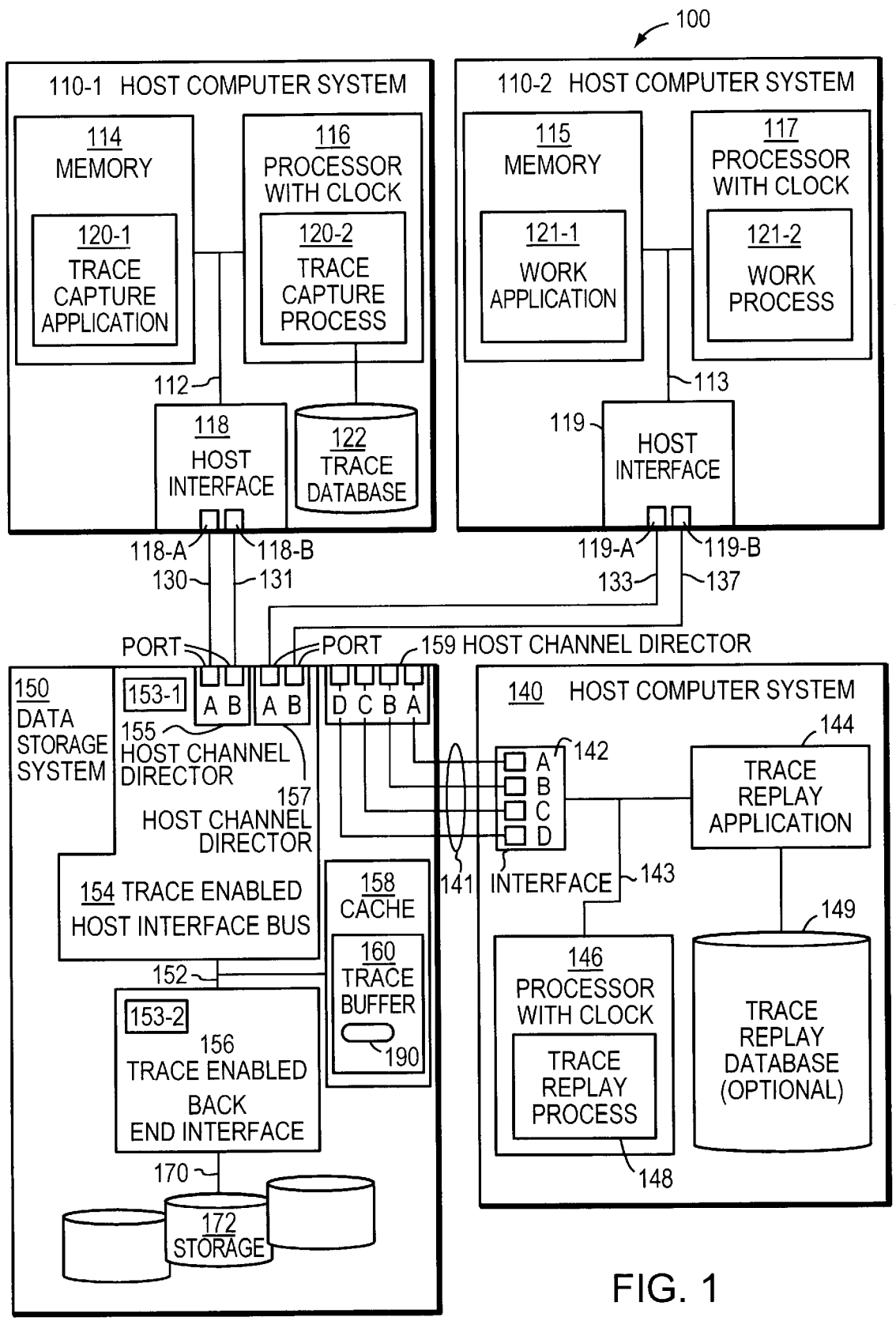
FIG. 1 shows a block diagram schematic of the system of this invention including a data storage system and application and process program logic operating in computer memory for carrying out embodiments of the method of this invention.

Embodiments of the present invention provide a unique system, method, and program product for replaying workload data accessed in a data storage environment for use in testing or for other reasons.

Overview

The invention is directed toward replaying workload data on a data storage system, and includes ability to access workload data for later replay on the same or a different system. So the first step of the overall embodiment of the method is to create or access a workload. Such accessed data is typically in the form of trace data accessed form I/Os operating on data volumes or logical devices on one or more data storage systems. Logical devices are sometimes interchangeably referred to as data volumes and generally refer to logical representations of physical volumes of data on a physical storage device. A workload trace data accessing system is described in related application Ser. No. 09/794,696 "METHODS AND APPARATUS FOR ACCESSING TRACE DATA" to William Zahavi et al. filed Feb. 26, 2001 and assigned to EMC Corporation the assignee of the present application and which is hereby incorporated by reference.

In general, and preferably, for the accessing of data it is extracted to a binary file for processing. The size of the output file, time for carrying out the operation being traced, or the number of I/Os traced desired will control the trace duration.

Once data is accessed in the form of a trace file it is analyzed and unraveled into threads, as described in more detail below so that the threads can be replayed on a data storage system, such as an EMC Symmetrix Data Storage System or Clariion Data Storage System available from EMC Corporation of Hopkinton, Mass. These threads act as I/O activity on the data storage system on which they are played, or in other words, the target data storage system In a preferred embodiment the exemplary data storage system for which workload data is to be captured and played back is a Symmetrix Integrated Cache Disk Arrays available from EMC Corporation of Hopkinton, Mass. However, it will be apparent to those with skill in the art that there is no limit to the use of this invention for any system including data storage. Nevertheless, regarding the preferred embodiment, such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

A replay management process receives the threads as input and is able to issue the I/Os for play back on a target. The target may be a data storage systems such as the preferred EMC Symmetric Data Storage System through the proper ports at the proper times.

Overview of Creation or Access Step

The data storage system is equipped with an event trace routine configured according to embodiments of the invention which is able to access trace data and/or trace buffer pointer information for a trace buffer when called upon to do so by the Trace Capture Process. Using the event trace routine, the Trace Capture Process can determine when new trace data is available in the trace buffer in the data storage system, for example, by detecting advancement of a trace buffer pointer. The Trace Capture Process can then use the event trace routine to access (i.e., to read) the trace data in the trace buffer and to obtain an update on the current value of the trace buffer pointer. By keeping track of previous and current trace buffer pointer locations and how frequently the trace buffer pointer changes, the Trace Capture Process can determine exactly how much, and how frequently, trace data is written to or added to the trace buffer during operation (e.g., execution) of a software program in trace mode in the data storage system.

Embodiments of the Trace Capture Process can adjust the frequency or timing between calls to the event trace routine to obtain trace data from the trace buffer at a rate sufficient enough to avoid trace data being overwritten in the trace buffer. The timing between calls to the event trace routine can be adjusted dynamically according to an adaptive timing algorithm which can take into account such factors as the number of events being traced, the amount of trace data created during the occurrence of trace events, and the speed and length of time during which the software program operating in trace mode is allowed to perform. Embodiments of the invention can thus remotely capture trace data over prolonged periods of performance of software programs that operate in trace mode in a data storage system without software developers having to interrupt the software programs in order to manually capture the trace data.

Overview of Replay Process

The replay management process reads trace data, unravels the trace into threads, and manages and dispatches the threads for replay as workload or I/O activity on a target system, e.g. the Symmetrix Data Storage System. On the Symmetrix for example, the process requires that the ports are available or else the user may be able to adjust the work to fit the configuration. Although, for simplicity, the invention embodiments are shown operating with only one host computer, it is intended that I/O from one or more hosts may be accessed, and played back to simulate normal asynchronous traffic experienced in a data storage environment.

An advantage of use of the replay system and process embodiments of this invention is the capability to play back a production scenario without the need to load a database of any kind or duplicate any workload transactions, although an optional database can be used. Bottlenecks will be able to be reviewed and isolated and alternative configurations tested with the exact workload. Further, analysis tools and reports can be integrated with the basic components of the invention to make it a complete I/O benchmarking solution. In addition, multiple traces (from multiple applications) could be combined to test new applications or consolidation of configurations.

System Architecture

FIG. 1 illustrates an example of a computing system environment 100 configured in accordance with embodiments of the invention. The computing system environment 100 includes a host computer system 110-1 and 110-2 coupled via data interface lines 130, 131, 133 and 137, respectively as shown, to data storage system 150.

The host computer system 110-1 includes an interconnection mechanism 112 coupling a memory 114, a processor with clock 116, a host interface 118. The memory 114 is encoded with logic instructions such as software application code and/or data which collectively form a trace capture application 120-1 configured in accordance with embodiments of the invention. The processor 116 can access the logic instructions that form the trace capture application 120-1 via the interconnection mechanism 112 to the memory 114 in order to perform (e.g., execute, run, interpret or otherwise operate) such logic instructions. When this happens, a Trace Capture Process 120-2 is formed via the combination of the logic instructions of the trace capture application 120-1 operating on the processor 116. In other words, the trace capture application 120-1 represents an embodiment of the invention in a computer readable medium such as the memory 114, which includes logic instructions that when performed on the processor 116, provide an embodiment of the invention referred to herein as the Trace Capture Process 120-2. During operation, the Trace Capture Process 120-2 can access a trace database 122 in order to store trace data, as will be explained.

The host computer system 110-2 includes an interconnection mechanism 112 coupling a memory 115, a processor with clock 117, and a host interface 119. The memory is encoded with logic instructions such as software application code and/or data that collectively form a workload application 121-1. The processor can access the logic instructions that form the workload via the interconnection mechanism 121 to the memory in order to perform (e.g., execute, run, interpret or otherwise operate) such logic instructions. When this happens, a workload process 121-2 is formed via the combination of the logic instructions of the application operating on the processor.

The I/O activity from the hosts is directed over respective host interfaces 118 and 119 and their respective host bus adapters (HBA's) 118A–B, and 119A–B to respective host channel directors 155 and 157 and their respective ports 155A–B and 157A–B. Later I/O activity can be replayed over the same ports, or simulating ports, such as 159 A, B, C, and D that could emulate the other four ports mentioned above if needed for some reason.

Host computer 140 includes an interconnection mechanism 143 coupling a memory 145, a processor with clock 146 and a host interface 142 having HBA's 142A–B. The memory is encoded with logic instructions such as software application code and/or data that collectively form a Trace Replay Application 144 configured in accordance with embodiments of the invention. The processor with clock 146 can access the logic instructions that form the trace replay application via the interconnection mechanism to the memory in order to perform (e.g., execute, run, interpret or otherwise operate) such logic instructions. When this happens, a Trace Replay Process 148 is formed via the combination of the logic instructions of the replay application operating on the processor. In other words, the Trace Replay Application represents an embodiment of the invention in a computer readable medium such as the memory, which includes logic instructions that when performed on the processor, provide an embodiment of the invention referred to herein as the Trace Replay Process. During operation, the Trace Replay Process can replay threads that duplicate I/O activity form a captured trace as explained below.

Figure 12:
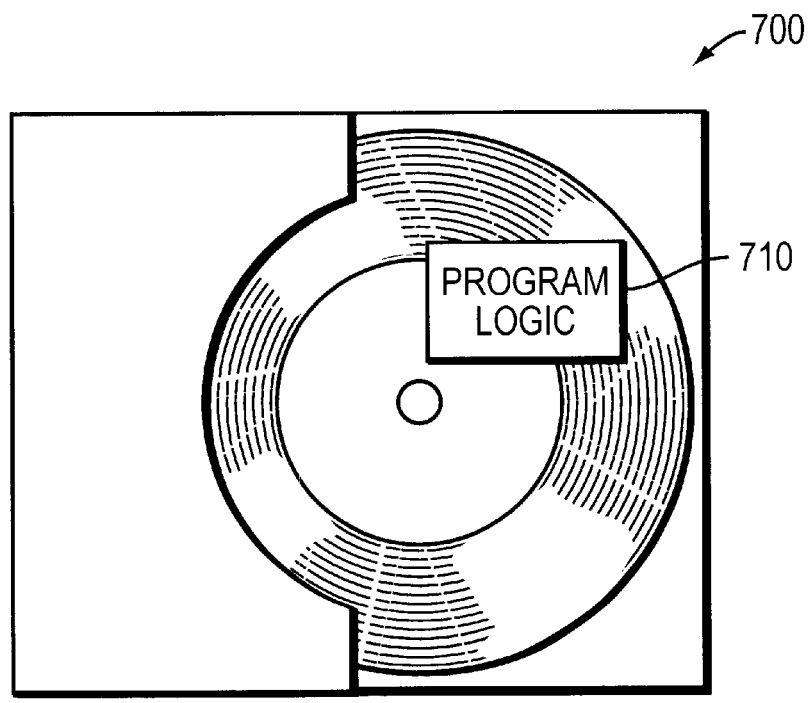
FIG. 12 is a computer program product including a computer-readable memory having program logic configured for enabling an embodiment of the method of this invention.

FIG. 12 shows a computer readable medium 700 including program logic 710 configured for carrying out one or more of the embodiments of the processes and method steps described herein, and may include all or part thereof of processes 120-1 or 148. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operate analogously to specific logic circuits.

Figure 2:
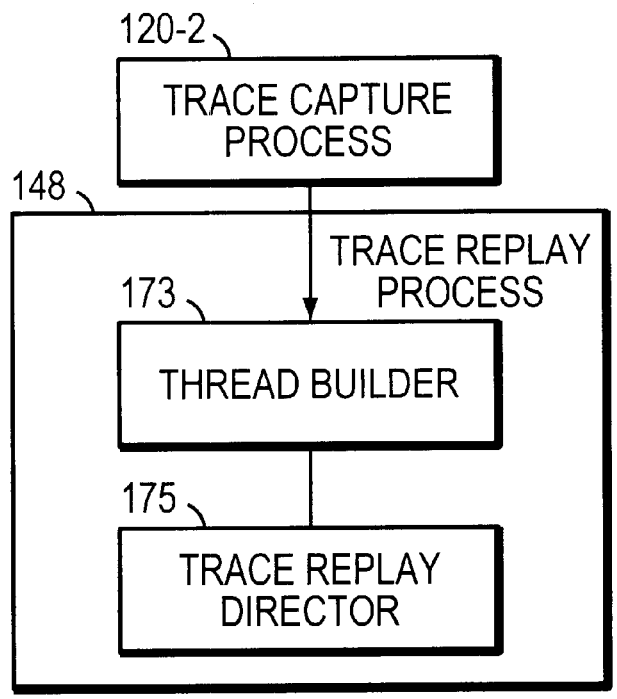
FIG. 2 shows a schematic block diagram overview of the functional relationship of the Trace Capture Process and the trace replay process that operate as an embodiment of the method of this invention with the embodiment of the system shown in FIG. 1.
Figure 8:
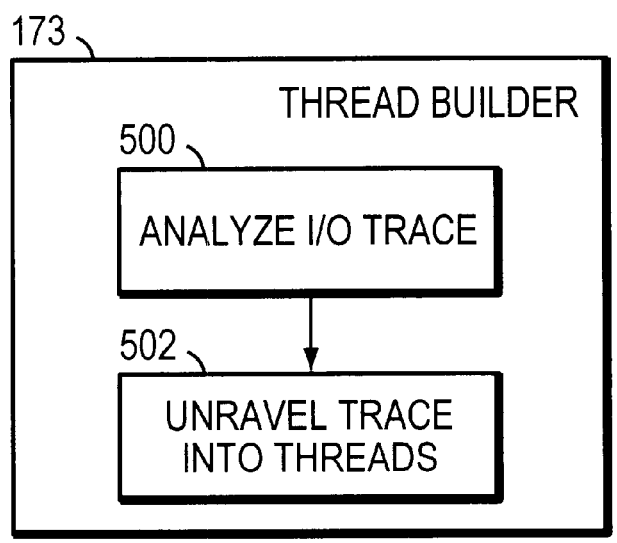
FIG. 8 shows a schematic block diagram of the trace builder which is part of the trace replay process shown in FIGS. 1 and 2.

Reference is now made to FIGS. 2 and 8 below. Referring to FIG. 2, an overview of processes of the invention are shown. The Trace Capture Process 120-2 typically precedes the Trace Replay Process 148. The Trace Replay Process 148 includes a thread builder 173 and the Trace Replay Director 175. Referring to FIG. 8, the Thread Builder 173 performs step 500: analyzing an I/O trace, and step 502: an unraveling of I/O trace data into threads. The trace is unraveled into threads, which can then be used by host 140 to carry out the Trace Replay Process 148 that plays back I/O activity on the data storage system.

Returning to the aspect of capturing the trace data, reference is once again made to FIG. 1. The data storage system 150 includes an interconnection mechanism 152 which couples a trace enabled front end interface 154, a trace enabled back end interface 156 and a cache 158 (e.g., a cache memory system). In this example embodiment, the cache 158 is encoded with a trace buffer 160 (e.g., a data structure) which is able to store trace data 190. The trace enabled back end interface 156 includes a coupling 170 to one or more storage devices 172 which may be disk drives, tape drives, or any other storage media. According to the general operation of the data storage system 150, the trace enabled front end interface 154 couples to the data interface 130 to process data access requests (not specifically shown) on behalf of host computer systems (e.g., 110 and others, not specifically shown) for access to data stored within the data storage system 150. The trace enabled back end interface 156 handles data access operations related to data stored within the storage devices 172. An example implementation of the data storage system 150 is a Symmetrix data storage system manufactured by EMC Corporation of Hopkinton, Mass., USA.

The trace enabled front end interface 154 and the trace enabled back end interface 156 are called "trace enabled" interfaces since each represents at least one processor which can perform a respective software program 153-1, 153-2 that can each operate in trace mode to produce the trace data 190 within the trace buffer 160. For purposes of the descriptions of embodiments of this invention, it is not particularly important which processor (one or more) operating a software program 153 (e.g., 153-1 or 153-2) within the data storage system 150 produces the trace data 190 in a trace buffer 160. To this end, the software programs 153-1 and 153-2 may be different and may operate separately or together to produce trace data 190 separately or concurrently. In this example then, such trace data 190 may be produced and placed into the trace buffer 160 from either the front end or back end interfaces 154 or 156. It is to be understood that these processors 154, 156 operating the software programs 153-1, 153-2 are illustrative only and that any processor within any component (e.g., a processor operating perhaps within a storage device 172) in the data storage system 150 may produce the trace data 190 in the trace buffer 160.

FIG. 2A is a flow chart of processing steps which show the general operation of a software program 153 operating on a processor such as the trace enabled front end and/or back end interface processors 154, 156 to produce trace data 190 within the trace buffer 160.

In step 200, the software program 153 detects a trace event. The trace event may be any event or operation within the software program 153 for which a software developer has designated that a trace routine (not specifically shown) that is to operate upon detection of the trace event to produce trace data 190.

Next, in step 201, the software program 153, via operation of a trace routine associated with the trace event, places the trace data 190 into the trace buffer 160.

In step 202, the software program 153 advances a trace buffer pointer (not specifically shown in FIG. 1) from a previous trace buffer pointer location to a current trace buffer pointer location indicating the end of the trace data 190 within the trace buffer 160. As will be explained shortly, trace routines which are responsible for detecting trace events and capturing trace data for placement into the trace buffer 160 are able to update the trace buffer pointer which points to, or otherwise indicates a location at which to place trace data 190 into the trace buffer 160 upon the occurrence of each trace event. The software program 153 thus updates the trace buffer pointer in step 202 and then returns to step 200 in order to detect the next occurrence of another trace event.

In this manner, a software program 153 operating in trace mode within the data storage system 150 is able to operate, and upon occurrence of user specified events, can trigger a trace routine to place the trace data 190 into the trace buffer 160. Using embodiments of the invention which will be explained next, the processing operations shown in FIG. 2A can continue for prolonged periods of time without concern for filling the trace buffer 160 with excessive amounts of trace data 190.

FIG. 2B is a flow chart of processing steps, which show the general processing operations provided by a Trace Capture Application 120-1 (FIG. 1) when performing (e.g., executing) on the processor 116 as the Trace Capture Process 120-2. In other words, the processing steps in FIG. 2B show the general operation of the Trace Capture Process 120-2, which provide access to the trace data 190 from the host computer system 110.

In step 205, the Trace Capture Process 120-2, which is typically under the control of a software test developer (not shown), establishes trace events (not specifically shown) for which the software program 153 will trigger a trace routine. By way of example, a software developer may be interested in analyzing the performance of the trace enabled front end interface 154 while handling SCSI commands over the data interface 130. Since the software program 153-1 in the data storage system 150 is responsible for controlling the general operation of the trace enabled front end interface 154, the software developer might perhaps establish one or more trace events related to the processing of SCSI commands by the software program 153-1. As a specific example, the software developer might establish a trace event to capture trace data related to SCSI interface Command Descriptor Blocks (CDBs) which are transferred across the data interface 130 between host computer system(s) and the data storage system 150.

Next, in step 206, the software developer activates event tracing by starting software programs 153-1 and 153-2 in trace mode on the data storage system 150 followed by the Trace Capture Process 120-2 on the host computer 110. The aforementioned procedure causes the software program 153-1 to perform using the processing and functionality described above with respect to FIG. 2A.

As the software program 153-1 operates in trace mode (i.e., operates with event tracing activated), trace data 190 will, at some point during the operation of the software program 153-1, begin to appear in the trace buffer 160. The exact time and rate at which the trace data 190 appears in the trace buffer 160 may be determined by a number of factors such as the number of trace events that the software developer establishes, the frequency of occurrence of trace events, the speed at which the software program 153 performs, the amount of trace data 190 that a trace routine captures for a particular trace event, and possibly other factors. For example, if a software developer establishes trace events for processing operations which frequently occur within the software program 153 and these operations are frequently exercised during performance of the software program 153 in trace mode, then it is likely that trace data 190 will rapidly appear within the trace buffer 160. Conversely, if trace events are established for certain processing tasks which are rarely encountered during normal operation of the software program 153, trace data 190 may appear in the trace buffer 160 less frequently.

In step 207, the Trace Capture Process 120-2 detects availability of trace data 190 in the trace buffer 160. There are a number of techniques which embodiments of the invention can provide to perform the detection of trace data 190 which appears in the trace buffer 160. Details of certain of such mechanisms and techniques will be explained shortly.

In step 208, the Trace Capture Process 120-2, in response to detecting availability of trace data 190 in the trace buffer 160, requests the trace data 190 from the trace buffer 160 within the data storage system 150. In a preferred embodiment of the invention, such a request for the trace data 190 in step 208 is performed using a system call to an event trace routine provided by embodiments of the invention (not specifically shown in FIG. 1) that operates within the data storage system 150 to access (e.g., read) the trace data 190 from the trace buffer 160.

In response to the request made to the Trace Capture Process 120-2 in step 208, the event trace routine operating in the data storage system 150 accesses the requested trace data 190 (as will be explained) and then passes back or returns the trace data 190 to the Trace Capture Process 120-2 via the data interface 130 interconnecting the host computer system 110 in the data storage system 150.

At this point, in step 209, the Trace Capture Process 120-2 receives the trace data 190 accessed via the event trace routine from the trace buffer 160 in the data storage system 150.

In step 210, the Trace Capture Process 120-2 stores the trace data 190 in the trace database 122 for analysis of the performance of the software program 153 for which the trace data 190 was produced. After processing the functionality shown in step 210, the Trace Capture Process 120-2 repeats the aforementioned processing by returning to step 207 to begin again the process of detecting availability of new trace data 190 placed into the trace buffer 160.

The Trace Capture Process 120-2 thus can continually repeat the processing of steps 207 through 210 in order to extract trace data 190 continuously and remotely as it is entered or added into the trace buffer 160 during operation of the software program 153 in trace mode. Since the Trace Capture Process 120-2 in this embodiment operates within the host computer system 110, there is little interference or disruption within normal operation of the software program 153 operating in trace mode. To this end, the repetitive processing operations shown in steps 207 through 210 shown in FIG. 2B preferably operate concurrently and asynchronously with the software program 153 operating in trace mode, which concurrently performs the processing operations 200 to 202 shown in FIG. 2A and as explained above. It is to be understood, however, that the Trace Capture Process 120-2 can, in certain embodiments, be implemented and operated on a processor within the data storage system 150 in order to capture trace data 190 locally. The processor may happen to be the same processor that operates the software program 153 that generates the trace data 190.

FIG. 3 illustrates a more detailed example of the internal operation and interaction between a trace enabled front end interface 154 and a cache 158 containing a trace buffer 160 as operating according to embodiments of the invention. As illustrated, the trace enabled front end interface 154 includes a front end processor 156 which performs (e.g., executes, interprets, runs or otherwise operates) the software program 153-1, which in this example is front end microcode or logic instructions which control the general operation of the front end interface 154. The software program 153-1 includes or otherwise has access to (e.g., can call) trace routines 165 which include an event trace routine 300 configured according to embodiments of the invention.

As explained above with respect to FIG. 1, the Trace Capture Process 120-2 (FIG. 1) can generate a system call 240 to the event trace routine 300. In this example, the system call 240 to the event trace routine 300 includes two parameters: a trace buffer pointer, and an amount of data to read from the trace buffer. When the Trace Capture Process 120-2 generates the system call 240 to the event trace routine 300, the event trace routine 300 processes the system call 240, as will be explained in FIG. 6, and returns a response 250 which includes a current value of the trace buffer pointer, and optionally, as will also be explained, trace data 190.

Attention is directed now to FIG. 3 and specifically to the interaction between event trace routine 300 and the cache 158 containing the trace buffer 160. In this example, the trace buffer 160 includes a plurality of trace buffer locations 162-1 through 162-N. Each trace buffer location 162 is capable of storing trace data 190. In this example, which illustrates the state of the trace buffer 160 after operation of the software program 153-1 after some period of time during which trace events have previously occurred, trace buffer locations 162-1 through 162-7 contain (i.e., store) respective portions of trace data 190-1 through 190-7. At the state of processing as illustrated in this figure, trace buffer locations 162-8 through 162-N do not yet contain trace data and are thus indicated as being EMPTY.

FIG. 3 also illustrates various trace buffer pointers 230-1 through 230-4. The trace buffer pointers 230 illustrated in this example represent the point of entry (i.e., the starting points and ending points) of various amounts (i.e., multiple portions) of trace data 190 which have been incrementally written to the trace buffer 160 during operation of the software program 153-1. The illustration shown in FIG. 3 thus represents a snapshot of the trace buffer 160 as it appears a point in time after a certain amount of processing has occurred in the software program 153-1 while performing on the front end processor 156.

By way of example, the first trace buffer pointer 230-1 represents the first location of the trace buffer pointer as of the start of the trace mode operation of the software program 153-1. While not shown here, at the start of the trace mode operation of the software program 153-1, all of the trace buffer locations 162 were empty. At some point into the processing operation of the software program 153-1 (i.e., during operation of the processing in FIG. 2A), upon the occurrence of the first trace event, a trace routine 165 placed or wrote the portions of trace data 190-1 and 190-2 into the respective trace buffer locations 162-1 in 162-2 and also advanced the location of the trace buffer pointer to the position at 230-2. As the software program 153-1 progressed further, another trace event occurred causing a trace routine 165 to place the portions of trace data 190-3 through 190-5 into the respective trace buffer locations 162-3 through 162-5 and further caused the advancement of the trace buffer pointer to the location 230-3. Finally, to arrive at the configuration illustrated in FIG. 3, the software program 153-1 continued to operate and encountered another trace event which caused the trace routine 165 to place portions of trace data 190-6 in 190-7 into respective trace buffer locations 162-6 in 162-7 and caused the advancement of the trace buffer pointer 230 to trace buffer pointer location 230-4, which in this example configuration is also called the current trace buffer pointer 230-C, as this is the last trace buffer location 162 which has received a portion of trace data 190. With respect to the location of any trace buffer pointer 230, a previous trace buffer pointer for purposes herein is the trace buffer pointer 230 that immediately proceeds (i.e., that is less than) the current trace buffer pointer 230-C.

Generally, according to the operation of embodiments of the invention, the event trace routine 300 is able to access to trace buffer 160 within the cache 158 in response to a system call 240. The event trace routine 300 can then access or obtain a current value or position of the trace buffer pointer 230, as well as the portions of trace data 190 within trace buffer locations 162 as specified in the system call 240. The Trace Capture Process 120-2 can use the particular trace buffer pointer locations 230 (as returned in response 250 to the systems calls 240) to sequentially access trace data 190 with each successive system call 240 to the event trace routine 300, as illustrated by the system call numerals 240-0 through 240-3 in FIG. 3.

Figure 4:
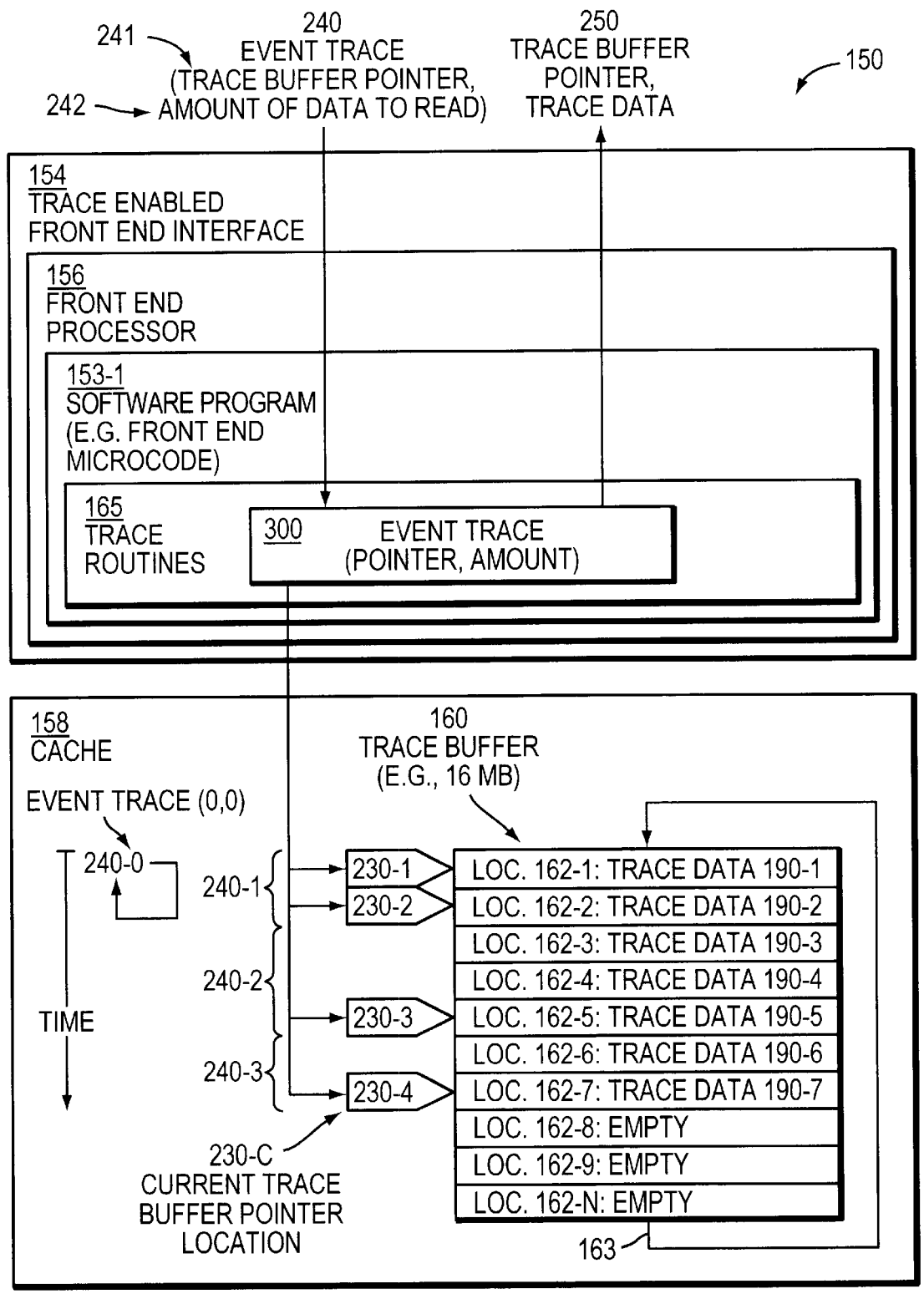
FIG. 4 illustrates a more detailed example of interaction between a Trace Capture Process, an event trace routine and a trace buffer within a cache memory in a data storage system configured according to embodiments of the invention.

FIG. 4 is a flow chart of processing steps, which shows details of an operation of an example embodiment of the Trace Capture Process 120-2 on a host computer system 110 (and thus also illustrates a representation of the logic instructions which form the Trace Capture Application 120-1 in FIG. 1 according to an embodiment of the invention). Generally, the processing steps shown in FIG. 4 represent additional details of the general processing cycle shown in steps 207 through 210 in FIG. 2B. For the operations or steps in FIG. 4 however, it is assumed that a software developer has already performed steps 205 and 206 in FIG. 2B to establish the trace events and to activate event tracing within the software program 153-1, which is now operating in trace mode according to the processing shown in FIG. 2A. The steps in FIG. 4 will be explained in part with reference to the example configuration of the data storage system 150 shown in FIG. 3.

In step 400, the Trace Capture Process 120-2 initializes a current trace buffer pointer variable and a previous trace buffer pointer variable to a null value such as zero. The Trace Capture Process 120-2 in the host computer system 110 maintains previous and current trace buffer pointer variables (not shown in the illustrations in FIGS. 1 or 3) in order to be able to determine when and how much trace data 190 is added to the trace buffer 160 in a data storage system 150.

In steps 401 through 404, the Trace Capture Process 120-2 generally detects the availability of trace data 190 in the trace buffer 160 by querying the data storage system 150 to determine if any trace data 190 has been placed into the trace buffer 160 (e.g., since the last query). If trace data has been placed in the trace buffer, the Trace Capture Process 120-2 proceeds to access the trace data 190, whereas if trace data 190 has not been placed into the trace buffer 160, the Trace Capture Process 120-2 waits a predetermined amount of time and repeats the process of steps 401 through 404.

More specifically, in step 401, the Trace Capture Process 120-2 can query the data storage system 150 by providing a request for a value of the current trace buffer pointer 230-C (FIG. 3), for example, by activating the system call 240-0 (FIG. 3) to the event trace routine 300 that performs in the data storage system 150. For each system call 240-0 in step 401, the trace buffer pointer parameter 241 (FIG. 3) is set to "0" and the amount of data to be read parameter 242 also set to "0". As will be explained, when the event trace routine 300 is activated with a system call 240 (e.g., 240-0) with at least one of the parameters 241, 242 set to "0" (e.g., preferably, and in this particular example, the amount of data to read parameter 242 is set "0"), then the event trace routine 300 only returns the current value of the trace buffer pointer 230-C and returns no trace data 190. In this manner, the event trace routine 300 can be called by the Trace Capture Process 120-2 to obtain the value of current trace buffer pointer 230-C without actually returning trace data 190.

Next, in step 402, the Trace Capture Process 120-2 determines if the value of the current trace buffer pointer variable equals the value of the previous trace buffer pointer variable. Recall that in step 400, both the current trace buffer pointer and previous trace buffer pointer variables were initialized to "0." Accordingly, if in step 401, the system call 240-0 (FIG. 3) to the event trace routine 300 obtains a value of the current trace buffer pointer variable other than "0," then this is an indication that trace data 190 was added to the trace buffer 160. If the current trace buffer pointer equals the previous trace buffer pointer in step 402, then no advancement of the current trace buffer pointer 230 (FIG. 3) has taken place in the cache 158 and thus no trace data 190 has been placed in the trace buffer 160 at this point and processing proceeds to step 403.

In step 403, the Trace Capture Process 120-2 waits (e.g., performs a delay process operation) a predetermined time period dynamically determined by an adaptive timing algorithm before proceeding back to step 401 to query the trace buffer point again.

An adaptive timing algorithm according to embodiments of the invention generally controls the frequency at which the Trace Capture Process 120-2 accesses trace data 190 from the trace buffer 160 based on detecting advancement of the trace buffer pointer. The frequency or rate at which such trace data accesses occur can be based on factors such as the speed of operation of the software program 153-1, the number of events selected for tracing, the frequency of occurrence of the events being traced, and the amount of trace data 190 placed into the trace buffer upon each advancement of the trace buffer pointer, among other factors.

By way of example, the Trace Capture Process 120-2 can determine the amount of trace data 190 placed into the trace buffer 160 for use by the adaptive timing algorithm by comparing any difference that may exist between the previous and current trace buffer pointer variables. If such a difference exists, the difference (e.g., in bytes, blocks, memory locations, or the like) represents the amount of trace data added or written to the trace buffer 160 since the last operation of accessing trace data 190 by the Trace Capture Process 120-2.

The adaptive timing algorithm can use, for example, the amount of trace data placed into the trace buffer as a guide for governing the frequency at which the trace data 190 should be accessed from the trace buffer 160. For example, if the difference between the previous and current trace buffer pointer variables is a large, then a large amount of trace data 190 has been added to the trace buffer 160 by the software program 153-1 operating in trace mode. Accordingly, the adaptive timing algorithm may determine that a shorter wait time period or delay should be used between successive accesses of trace data 190 in the trace buffer 160 in order to ensure that all trace data 190 is extracted and to avoid newer trace data being overwritten onto older trace data that might not yet have been accessed. Alternatively, if the difference between the previous and current trace buffer pointer variables is relatively small, this indicates that a small amount trace data 190 was placed into the trace buffer 160. Thus, the adaptive timing algorithm can increase the wait time period between successive accesses of trace data 190.

While not specifically shown, embodiments of the invention can use an adaptive timing algorithm that keeps a histogram of the relative sizes or amounts of trace data that are placed into the trace buffer 160 upon each iteration of step 403. Using such a histogram, the adaptive timing algorithm can detect patterns of increasing or decreasing amounts of trace data being placed into the trace buffer over prolonged periods of time during which the software program 153 operates and can adjust the wait time period accordingly. If an increase in an amount of trace data exceeds a predetermined amount of data over a predetermined time period, the adaptive timing algorithm can decrease the time period with which to wait in step 403 before continuing processing, whereas a decrease in the amount of trace data may cause the adaptive timing algorithm to increase the predetermined time period with which to wait in step 403 before proceeding.

Example amounts of time to wait between successive queries of the value of the current trace buffer pointer (i.e., the time period with which to wait in step 403) might be one second or more while amounts of trace data 190 being added to the trace buffer 160 are relatively small, while shorter amounts of time, such as one-quarter second or less, may be used in step 403 if trace events happen rapidly or if amounts of trace data 190 become larger. Once the time period elapses as determined by the adaptive timing algorithm, processing proceeds from step 403 to step 404.

In step 404, the Trace Capture Process 120-2 then sets the previous trace buffer pointer equal to the current trace buffer pointer and processing returns to step 401 in order to repeat the process of querying the data storage system 150 to determine if trace data 190 has been placed in the trace buffer 160.

In this manner, the Trace Capture Process 120-2 can perform successive iterations of steps 401 to 404 to detect advancement of the trace buffer pointer 230 within the cache 158 of the data storage system 150. Once the current trace buffer pointer value differs from a previous trace buffer pointer value (as maintained by the Trace Capture Process 120-2), processing proceeds to steps 405 to 410 in order to have the Trace Capture Process 120-2 access the trace data 190 that has been added to the trace buffer 160.

In particular, in step 405, the Trace Capture Process 120-2 first performs a check to determine if the value of the current trace buffer pointer variable is less than (<) the value of the previous trace buffer pointer variable. Essentially, step 405 causes the Trace Capture Process 120-2 to check for the special case or possibility that trace data 190 may have been written (i.e., by the software program 153-1 operating in trace mode to cause trace routines 165 to place the trace data 190 into the trace buffer 160) to the trace buffer 160 in an amount which exceeds or goes beyond the end of the trace buffer 160. For purposes of the explanation of processing up to this point, assume that the value of the current trace buffer variable is not less than the value of the previous trace buffer pointer variable. In other words, assume that at this point in processing, the current trace buffer pointer 230-C is ahead of (i.e. is greater than) the previous trace buffer pointer in the trace buffer 160. As such, Trace Capture Process 120-2 processing proceeds to step 408.

In step 408, the Trace Capture Process 120-2 determines an amount (e.g., a number of bytes) of trace data 190 that has been written to the trace buffer 160. In this example embodiment, a variable "SIZE_OF_TRACE_DATA" is set equal to the value of the current trace buffer pointer variable minus the value of the previous trace buffer pointer variable. The difference between these trace buffer pointer values reflects the amount of trace data 190 added to the trace buffer 160. Once this amount of trace data 190 is determined, processing proceeds to step 409.

In step 409, the Trace Capture Process 120-2 provides a request for the trace data 190 in the trace buffer 160. This is done in this embodiment via a system call 240 to the event trace routine 300. The parameter value 241 (i.e., a trace buffer pointer value) used in the system call 240 to the event trace routine 300 in step 409 contains the value of the previous trace buffer pointer variable, while the parameter value 242 for the amount of data to read from the trace buffer 160 contains the value of the parameter SIZE_OF_TRACE_DATA, as determined in step 408 explained above. In this manner, the call 240 to the event trace routine 300 in step 409 causes the event trace routine 300 to read an amount of trace data 190 as specified by the parameter SIZE_OF_TRACE_DATA beginning in a trace buffer location 162 determined by the value of the previous trace buffer pointer variable. As will be explained shortly, the request for trace data provided to the data storage system 150 in this manner causes the event trace routine 300 to return the requested trace data 190 from the trace buffer 160 to the Trace Capture Process 120-2 in response to the request. In step 409, once the trace data 190 is received (i.e., via response 250 in FIG. 3) by the Trace Capture Process 120-2, processing proceeds to step 410 in FIG. 4.

In step 410, the Trace Capture Process 120-2 stores the trace data 190 obtained in step 409 into the trace database 122. At this point, the processing of the Trace Capture Process 120-2 proceeds back to step 403 and 404 at which point the previous trace buffer pointer variable gets set equal to the current trace buffer pointer variable.

In this manner, returning to step 404 causes the previous trace buffer pointer variable in the Trace Capture Process 120-2 to always remain up-to-date with the most recent value of the current trace buffer pointer variable, once the trace data 190 existing in the trace buffer 160 between these pointer values has been obtained (i.e., has been read) in step 409. That is, once the Trace Capture Process 120-2 obtains any trace data 190 that exists in the trace buffer 160 between the previous and current values of the trace buffer pointer, the previous value of the trace buffer pointer is set to the current value of the trace buffer pointer and the Trace Capture Process 120-2 returns to the iterative processing of steps 401 through 404 in order to detect further advancement of the current trace buffer pointer.

Using these processing techniques, embodiments of the invention can periodically detect advancement of the trace buffer pointer which indicates that trace data has been added to the trace buffer 160. Upon such a detection, the Trace Capture Process 120-2 can determine how much trace data 190 has been added based on its knowledge of the previous value of the trace buffer pointer in comparison to the current value of the trace buffer pointer. The Trace Capture Process 120-2 can then use the event trace routine 300 via a system call 240 which indicates to the event trace routine 300 exactly how much trace data 190 is to be read from the trace buffer 160, beginning at the location corresponding to the previous trace buffer pointer (and extending in length up to the current trace buffer pointer). Once the trace data 190 has been obtained via this technique, the Trace Capture Process 120-2 can update the previous trace buffer pointer value to be equal to the current trace buffer pointer value and can then proceed to detect another advancement of the trace buffer pointer. This processing repeats itself such that trace data 190 is continually extracted from the trace buffer 160 in an automated manner.

The frequency at which this processing occurs can be controlled, as explained above, by an adaptive timing algorithm which waits a time period between accesses to trace data 190 to allow for extraction of the trace data 190 from the trace buffer 160 in substantially a real-time manner. That is, the faster that the software program 153-1 performs and/or encounters trace events which cause the creation of trace data 190 in the trace buffer, the faster the Trace Capture Process 120-2 performs iterations of the processing shown in FIG. 4.

Returning attention now briefly back to the example configuration illustrated in FIG. 3, the general operation of the processing shown in FIG. 4 will be explained in relation to the example occurrences of events as illustrated by trace buffer pointer positions 230.

Upon the start of the processing in FIG. 4, the trace buffer pointer 230 begins at location 230-1 and the trace buffer 160 is empty. As the software program 153-1 operates in trace mode and begins to place portions of trace data 190 into the trace buffer 160, the processing steps 401 through 404 detect the first addition of trace data 190 into the trace buffer 160 by advancement of the trace buffer pointer from position 230-1 (value saved as the previous trace buffer pointer) to position 230-2 (value of a current trace buffer pointer at this point in processing). The repetitive system calls 240-0 illustrated in FIG. 3 show how the event trace routine 300 can be used in this manner to detect advancement of the trace buffer pointer. After each advancement of the trace buffer pointer from 230-1 to 230-2, then from 230-2 to 230-3, and then from 230-3 to 230-4, step 401 detects the change of the current trace buffer pointer value from the previous trace buffer pointer value and processing proceeds from step 402, through step 405, to step 408 which computes the size, or amount, of trace data 190 added to the trace buffer 160. Step 409 then requests and receives (i.e., accesses or reads) the relevant portions of trace data 190 and also obtains the most recent value for the current trace buffer pointer 230. Once the trace data is stored, step 403 resets the previous trace buffer pointer value and the process repeats to detect the next advancement of the trace buffer pointer.

Returning attention now to processing step 405, eventually, as more and more trace data 190 is added to the trace buffer 160 during trace mode operation of the software program 153-1, the portions of trace data 190 will reach the end of the trace buffer 160 (i.e., will be written to the trace buffer location 162-N and then back to location 162-1). When this happens, the trace routines 165 (FIG. 3) begin writing new trace data 190 over older portions of trace data (e.g., trace data portions 190-1, 190-2, and so forth) at the start of the trace buffer 160.

Figure 6:
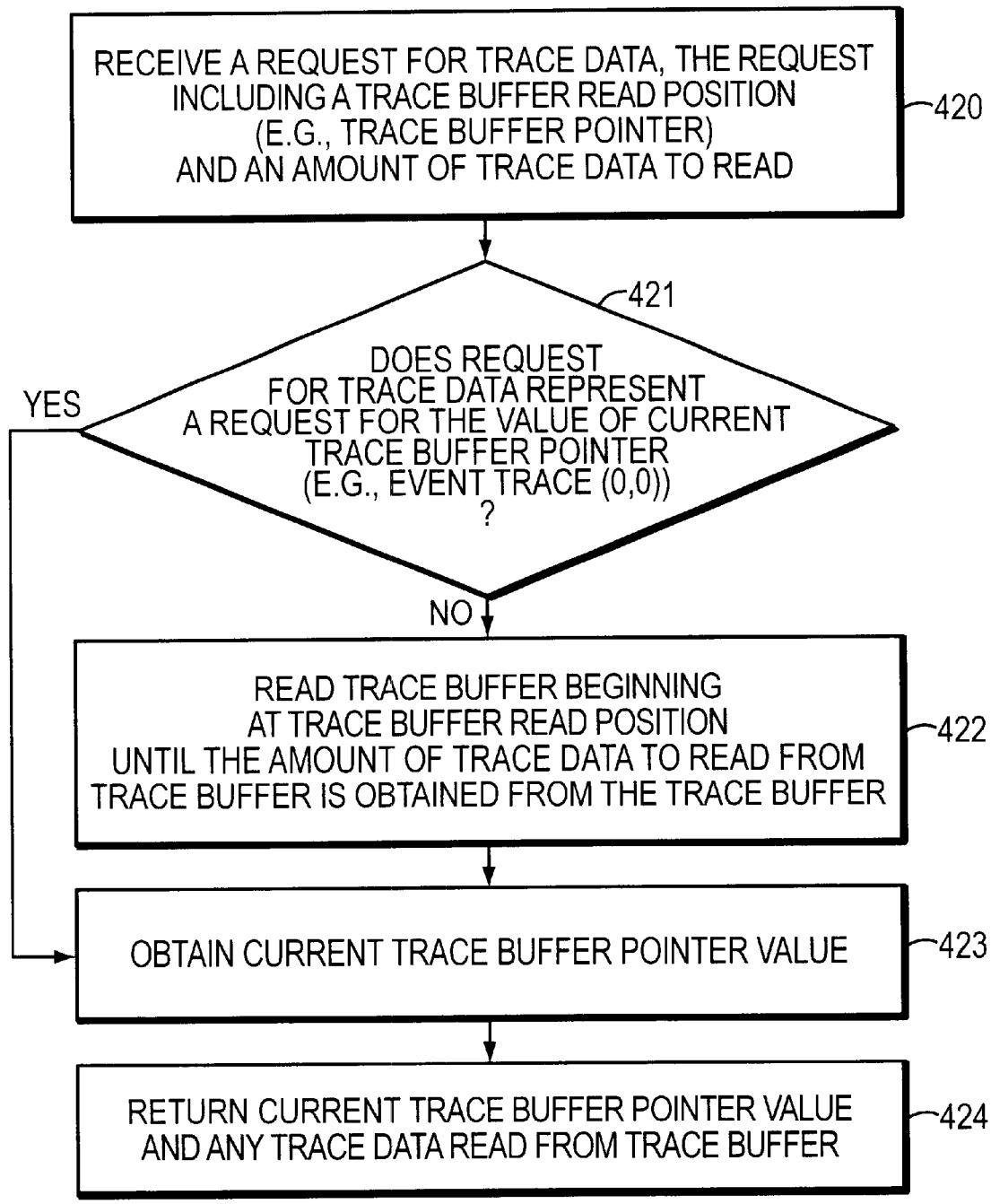
FIG. 6 is a flow chart of processing steps that show the operation of an event trace routine in a data storage system configured according to embodiments of the invention to access trace buffer pointer information and trace data in a trace buffer.
Figure 7:
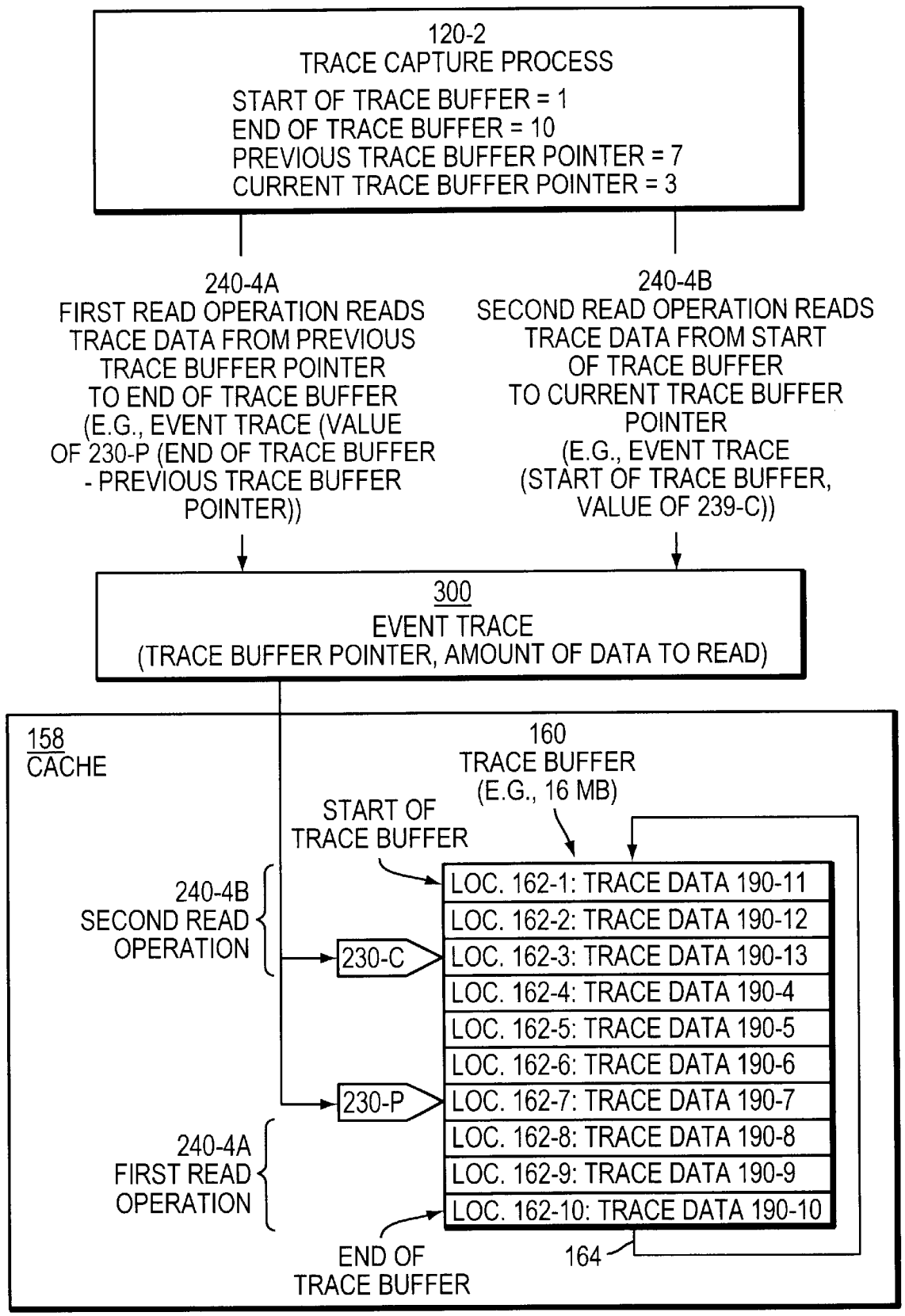
FIG. 7 illustrates an example interaction between a Trace Capture Process, an event trace routine, and a trace buffer in which newer trace data has overwritten older trace data in the trace buffer.

FIG. 6 illustrates an example of this scenario in which the trace buffer 160, as it existed in FIG. 3, subsequently receives, via an occurrence of a trace event during trace mode operation of the software program 153-1, portions of trace data 190-8 through 190-13. Recall that the trace buffer 160 is a circular trace buffer. As such, since that are six portions of trace data 190-8 through 190-13, the trace routines 165 that generate the portions trace data 190-8 through 190-13 write the first three portions of trace data 190-8 through 190-10 into the trace buffer locations 162-8 through 162-10, while the remaining three portions of trace data 190-11 to 190-13 are written into the trace buffer 160 beginning at the start of the trace buffer 160 (i.e., into trace buffer locations 162-1 through 162-3).

Figure 5:
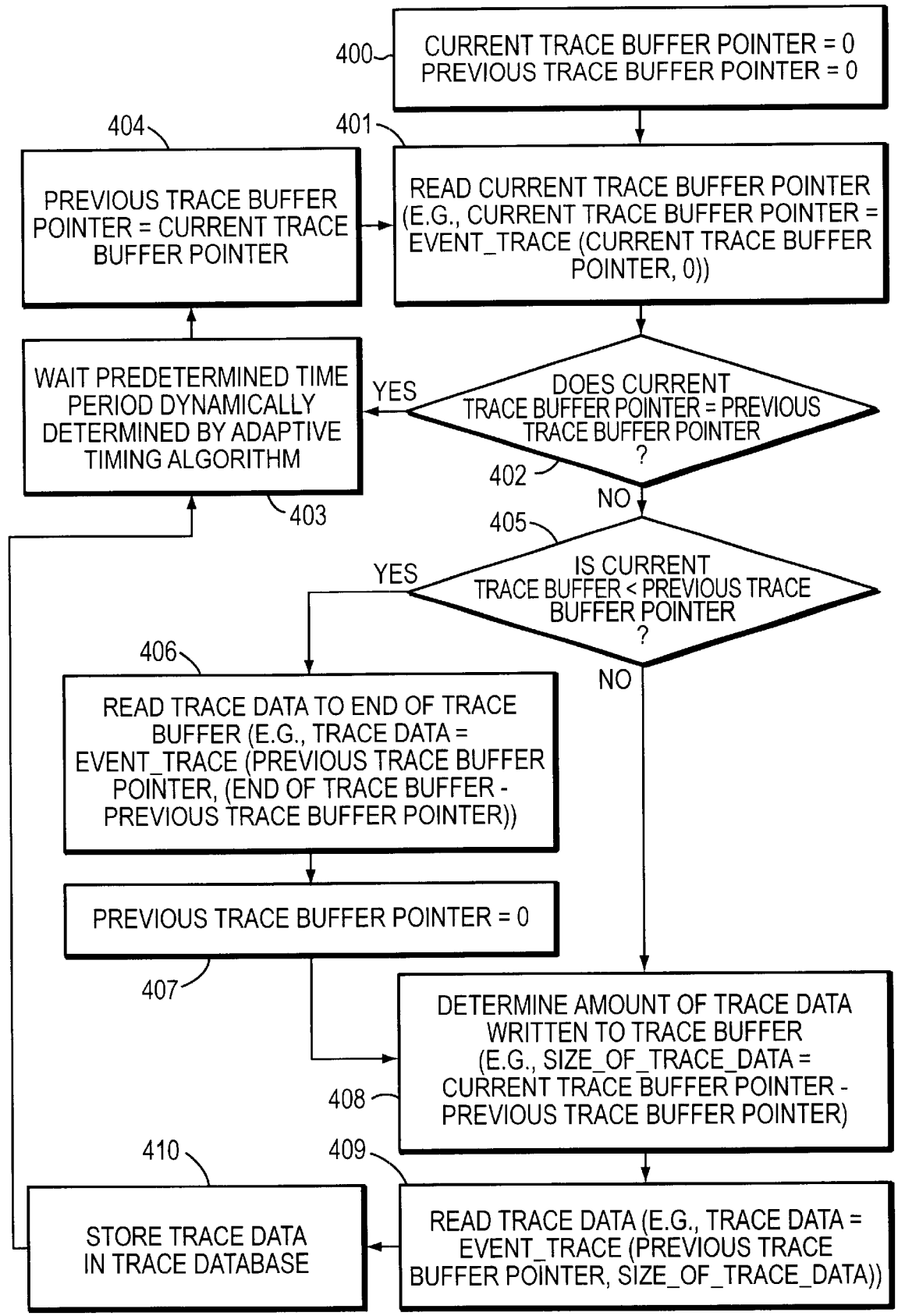
FIG. 5 is a flow chart of processing steps that show details of an operation of a Trace Capture Process configured according to embodiments of the invention.

FIG. 6 also illustrates the values of both the current trace buffer pointer 230-C as well as the previous trace buffer pointer 230-P after the trace routines 165, under control of the software program 153-1, write the trace data portions 190-8 through 190-13 into the trace buffer 160. Example numerical values of these variables (corresponding to trace buffer location positions) are illustrated at the top of FIG. 5 within the Trace Capture Process 120-2. Specifically, the start of the trace buffer is 1, the end of the trace buffer is 10, and the value of the current trace buffer pointer 230-C is equal to the trace buffer location 162-3 or "3", while the value of the previous trace buffer pointer 230-P is equal to the trace buffer locations 162-7 or "7".

Returning now to the discussion of the processing in step 405 in FIG. 4 (and referring to FIG. 6), under the aforementioned circumstances, the value of the current trace buffer pointer variable 230-C (at trace buffer location 162-3) is less than the value of the previous trace buffer pointer variable 230-P (at trace buffer location 162-7). This indicates that trace data 190 has been written beyond the end of the trace buffer 160 and has thus overwritten portions of trace data 190 beginning at the start of the trace buffer (trace buffer location 162-1). In this instance, the processing of the Trace Capture Process 120-2 in step 405 detects this situation and proceeds to step 406.

In step 406, the Trace Capture Process 120-2 first reads an amount of trace data starting from the location of the previous trace buffer pointer 230-P and extending to the end of the trace buffer (trace buffer location 162-10). As shown in FIG. 4, the exact amount of trace data 190 which the Trace Capture Process 120-2 accesses in this manner (i.e., the amount of data to read parameter 242) can be computed by subtracting the value of the previous trace buffer pointer variable (e.g., corresponding to trace buffer location 162-7 or just "7" in this example) from the value equal to the end of the trace buffer (e.g., "10" in this example). The result reflects the amount of trace data to be read from the position of the previous trace buffer pointer 230-P to the end of the trace buffer (i.e. up to and including the portion of trace data 190-10 stored in trace buffer location 162-10). As will be explained shortly, the call to the event trace routines 300 as illustrated in step 406 also causes the event trace routines to return the value of the current trace buffer pointer which corresponds to location 230-C in FIG. 6. Next, processing proceeds from step 406 to 407.

In step 407, the Trace Capture Process 120-2 sets the value of the previous trace buffer pointer variable to be zero ("0"). Processing then proceeds to steps 408 through 410 which operate as explained above according to the current values of the previous and current trace buffer pointer variables. In other words, if the Trace Capture Process 120-2 performs steps 408 to 410 after processing steps 406 and 407 as explained above, the value of the previous trace buffer pointer variable is zero and thus the trace data 190 obtained in response to the second system call to the event trace routines 300 in step 409 causes the event trace routines 300 to access the remaining portions of trace data 190-11 to 190-13 beginning at the start of the trace buffer and extending into the trace buffer 160 up to including the trace buffer location 162-3 of the current trace buffer pointer 230-C.

Accordingly, in situations where the trace data 190 is written to the trace buffer 160 beyond the end of the trace buffer, the Trace Capture Process 120-2 of this embodiment of the invention accesses the trace data 190 using two separate system calls, as illustrated in FIG. 6 is system calls 240-4A and 240-4B. The system call 240-4A performs a first read operation to read trace data 190 from the previous trace buffer pointer location 230-P to the end of the trace buffer 160, while the second system call 240-4B performs a second read operation to read any remaining portions of trace data 190 (i.e., portions which overwrite older trace data) from the start of the trace buffer to the current trace buffer pointer location 230-C. In this manner, the Trace Capture Process 120-2 of the invention is able to retrieve all trace data 190 from the trace buffer 160, even in situations where the trace data 190 is so voluminous so as to extend from the end of the trace buffer back to the beginning of the trace buffer.

FIG. 5 illustrates a flow chart of the processing operations performed by an event trace routine 300 configured according to one embodiment of the invention. As explained above, the event trace routine 300 resides as an operable entity (e.g., a system call, library routine, subroutine or other accessible logic entity) within the data storage system 150 and is remotely operable (i.e., callable) by the Trace Capture Process 120-2. Generally, the event trace routine 300 operates as explained above to return a trace buffer pointer value 230 and also, in some instances, portion(s) of trace data 190, depending upon the values of the parameters 241, 242 passed via the systems calls 240 to the event trace routine 300.

Specifically, in step 420, the event trace routine 300 receives a request for trace data (e.g., receives a system call 240). The request 240 includes a value (i.e., a parameter setting) for a trace buffer read position 241 (FIG. 3) as well as an amount of trace data to read 242 (FIG. 3). Such parameter values may be zero or non-zero values, which effects how the event trace routine 300 operates.

In step 421, the event trace routine 300 determines if the request for trace data (e.g., the system call 240) represents a request for the value of the current trace buffer pointer, or whether the request 240 also represents a request for trace data. Such a determination may be made by examining one or more of the values of the trace buffer pointer parameter 241 and/or the amount of trace data to read parameter 242 to determine if such values are zero. In a preferred embodiment of the invention, if the Trace Capture Process 120-2 provides a system call 240 to the event trace routine 300 which contains zero values for both parameters 241 and 242, then the event trace routine 300 in step 421 determines that the request for trace data (i.e., the system call containing the zero value parameters) is only a request for the current value of the trace buffer pointer 230.

If this is the case (i.e., if the system call 240 contains a call to the event trace routine containing parameters having a value of 0), then processing proceeds to step 423 at which point the event trace routine 300 obtains the current trace buffer pointer value 230 from the trace buffer 160.

Next, in step 424, the event trace routine 300 returns the current trace buffer pointer value 230 and any portions of trace data 190 that were read from the trace buffer 160. Such portions of trace data 190 may be read from the trace buffer 160, if, in step 421, the event trace routine 300 determines that the request for trace data 190 (e.g., system call 240) represents a request for trace data 190, in addition to a request for the value of the current trace buffer pointer 230.

That is, returning to step 421, if the request for trace data 240 contains non-zero parameter values 241 and 242, then processing proceeds to step 422 at which point the event trace routine 300 reads portions of trace data 190 from the trace buffer 160 beginning at the trace buffer read position parameter 241 and continuing until the amount of trace data to be read (i.e., as represented by parameter 242) is obtained (i.e. is read) from the trace buffer 160. This trace data is then returned to the calling entity, which in these examples is the Trace Capture Process 120-2.

Using such techniques, an event trace routine 300 configured according to embodiments of the invention is able to accept requests for either the value of the current trace buffer pointer 230, or the value of the current trace buffer pointer 230 in addition to one or more portions of trace data 190 which are to be obtained from the trace buffer 160. In response to such a request, the event trace routine 300 can access the request information and can return such information to the calling Trace Capture Process 120-2 for use as explained above to extract trace data 190 from the trace buffer 160 within the data storage system 150.

FIG. 9 shows how a table 520 detailing how a trace is unraveled for replay. The Thread Replay Process includes a Thread Builder that analyzes an I/O trace and unravels it for Threads that can played it back on the data storage system (discussed above with reference to FIGS. 2 and 8). Each trace I/O includes a timestamp shown in an appropriate column. Each trace I/O also includes information indicating the source, i.e. the port and channel director. By way of example, table 520 is shown with four columns, each one corresponding to a particular port coupled with a particular director on data storage system 150 (FIG. 1). One table is shown for convenience, but in practice it may be more convenient to first unravel the trace data in separate tables, wherein each table is related to a particular director and port, which then may be used to create such a table as 520 if needed for some reason. The trace can be unraveled in various ways, such as by looking for particular SCSI Command Descriptor Block (CDB) entries that describe SCSI I/O commands that may be seen over SCSI or Fibre ports, such as the ports on the preferred Symmetrix data storage system.

For example, I/O trace data is collected for times beginning at to and ending at $t_{I+n}$ that is sourced from each host interface port on each host channel director in communication with the data storage system 150. So in the representative example, I/O trace data at time to, is collected for each port and is noted as follows in an respective column in the table in the following fashion: $I/O_0$(A-155), $I/O_0$(B-155), $I/O_0$(A-157), $I/O_0$(B-157). This means, respectively that each I/O was collected at that particular time and can be sourced to the channel director import identified in the parentheses. And so for example, at time $t_{I+n}$ I/O trace data is likewise collected for each port on each channel director. Timer entries are collected for each port to allow calculating any offsets in time of I/O's that occur at almost the same time so that at any given point in time it can be discerned which ports were active.

The analysis is based on being able to sort by time and source of I/O (host channel director and port), so that the I/O can later be played back in symphonic fashion. Each channel in the preferred embodiment has own clock. Clocks must be synchronized, and the processor clock is considered. Inside each trace buffer every event has a timestamp that comes from a director. By checking global pointers, the system can determine where to write data and what data may be locked while being written by director. The contents are always different, but each director puts its on-time clock stamp and identifier which can then be synchronized to a global time for replay.

The playback process requires reading of the trace file and sending an I/O request at the appropriate time in order to emulate a real workload. An important aspect of the invention is playing back the I/O events in the correct sequence. It is extremely complicated because of all the I/O traffic, and devices and ports involved in a data storage system and that is at least one reason why a simple I/O driver-based system like those in prior art systems is inadequate for replaying a workload of a data storage system.

Figure 10:
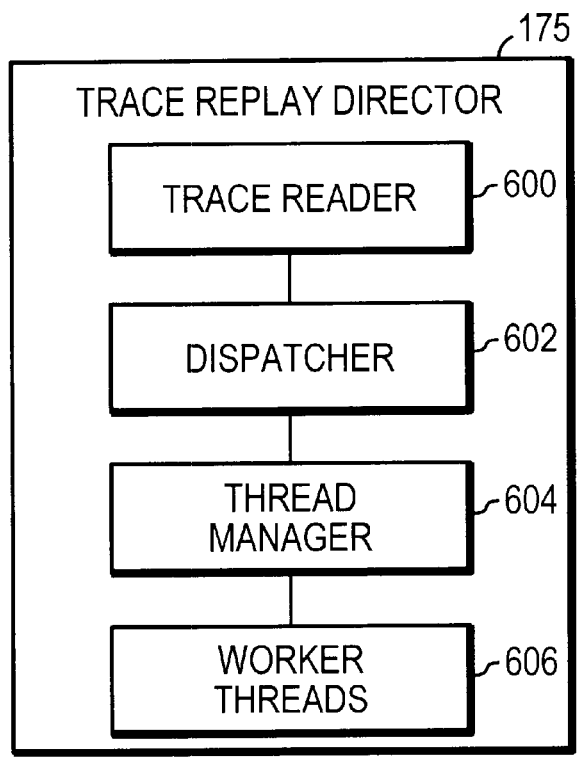
FIG. 10 shows a schematic block diagram of the trace replay director builder which is part of the trace replay process shown in FIGS. 1 and 2.

The Trace Replay Director 175 is shown in FIG. 10. The Replay Director is part of the Replay Process 148 and is responsible for turning the unraveled trace into a stream of I/O activity for Worker Threads (discussed below) that are marshaled back to the target data storage system 150 with the same timing and relative work activity (e.g. data size, and operation type) as the trace that was captured.

In order to accomplish this task, the director includes a Trace Reader 600, a Dispatcher 602, a Thread Manager 604, and one or more Worker Threads 606. The Thread Manager includes the ability to issue more Worker Threads if needed. The Trace Reader 600 reads the trace file and passes the trace as an I/O operation to the Dispatcher 602. The Dispatcher assigns the I/O operation to the next available Worker Thread of Worker Threads 606. It is the Worker Threads that are responsible for having the assigned I/O sent to the target data storage system on time. A Worker Thread also is responsible for sending the I/O over the correct port.

The Thread Manger 604 starts and stops Worker Threads and adds more should the Replay Process start executing I/O's late, and this ensures that replayed I/O activity is at the appropriate level of the work seen originally. The Dispatcher only assigns work to the next available Worker Thread and then it signals when the playback is complete The Thread Manager measures the I/O activity, determines when the Worker Thread gets finished for example, and when to activate the next one over host interface lines 141 for input directly through channel director 155 and 157 and their respective ports, or over 159 and its ports for causing playback of I/O work on data storage system 150.

Upon invocation the Dispatcher parses and validates all command line arguments. The target data storage system for playback is then polled for configuration information. The Trace Reader is then launched which begins reading the trace data and queues it to the buffer. If the end of the trace data is reached, it restarts from the beginning. It continues this process until the playback is complete.

The Thread Manager manages all I/O Worker Threads and monitors the playback to insure the I/O workers are starting the I/Os on time. If there is a lag, the Thread Manager dispatches additional I/O Worker Threads, as discussed above. Optionally, statistics collection may be enabled/initialized for collecting statistics of the target data storage system. Also optionally, the Trace Capture application may be launched to capture traces of the I/Os being played back.

The Replay Process reads the I/O buffer and assigns I/Os to the Worker Threads, which perform the I/O operation, until all I/Os are completed, or until a predetermined time is reached. It then notifies the Trace Reader, Thread Manager, and Worker Threads that playback is complete.

The I/O Worker Threads wait to be assigned a particular I/O operation to perform, with delays appropriately based on the I/O timestamp and an implied performance counter that is part of the replay process. An I/O command for the specified storage device on a specified storage data port in effect replays the captured trace. Once the I/O is completed, the I/O Worker Thread waits to be assigned another I/O operation. This continues until the Dispatcher indicates playback is complete. Optionally, statistics collection and the Trace Capture Application can be stopped. When all threads terminate, statistics are computed and displayed, then execution is complete.

Figure 11:
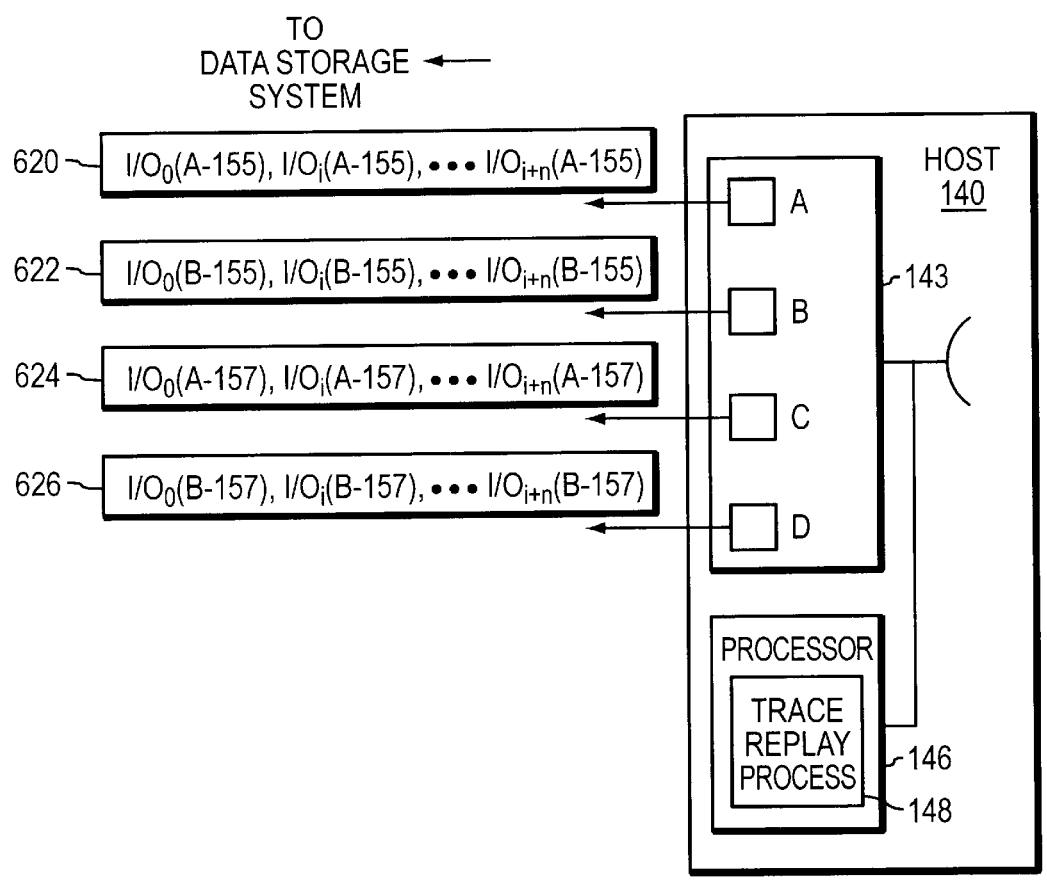
FIG. 11 shows an example of threads being replayed for the exemplary data storage system of the system of FIG. 1.

FIG. 11 shows I/O's 620, 622 624, and 626 being played back over channel interface 142. Note that the I/O's correspond to the information gathered in the unraveled trace table (FIG. 9) and each I/O is identified with a timestamp and the source (director import) of the data, as well as the other information discussed above with reference to I/O description. The replayed I/O is then received through a host channel director and played back so that the same type of operation and size of data operates on the same logical volume as the original captured trace.

Thus, the playback can essentially be turned on to create an experimental or lab type of environment wherein the I/O activity experienced at one time can be recreated on the same or a different host system. Or various factors can be manipulated to see what impact that has. And multiple hosts can be simulated using such playback. Thus, the invention provides a low cost but very accurate way to test multiple types of scenarios that might occur in a production environment.

While the example explanations of preferred embodiments presented herein explain certain techniques for accessing trace data and playing it back within the data storage system, it is to be understood by those skilled in the art that variations on these mechanisms and techniques are possible and are intended to be within the scope of embodiments of the invention. For example, the host computer systems may be any type of general purpose or dedicated (e.g., specific purpose) computer system and it is to be understood that the host computer system shown in the figures is shown by way of example only. Likewise, the data storage system can be any type of data storage system, large or small, and may contain any number of processors that operate to produce trace data 190 in a manner such as that explained above, and replay it as claimed below.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for having a workload scenario accessed and played in a data storage environment including at least one host computer and a first storage system that is in communication with the at least one host computer and which environment includes a plurality of data storage volumes representing data stored on physical storage devices that are part of the first data storage system, the method comprising the steps of:

accessing a trace of I/O commands from the at least one host computer to the first data storage system that are experienced on one or more data storage volumes of the plurality of data storage volumes that represent data stored on the first data storage system; and playing a replication of the trace of I/O commands on one or more data storage volumes included with a second data storage system, and wherein the playing of the trace includes analyzing the trace of I/O commands and creating replay I/O commands from the trace of I/O commands that can be replayed on the second data storage system.

2. The method of claim 1, wherein the replay I/O commands includes one or more time notations indicating a time-relation for I/O commands that occurred during the access of the trace of I/O commands.

3. The method of claim 2, wherein the one or more time notations are used for replaying the I/O commands so that the replay is timed in accordance with the one or more timing notations.

4. The method of claim 3, wherein the replay I/O commands includes one or more notations indicating the size of any data on which an I/O action occurs during the accessing of the trace of I/O commands.

5. The method of claim 4, wherein the one or more notations indicating the size of any data on which an I/O action occurs during the accessing of the I/O trace is used to approximate a replication of the I/O commands that occurred during the access of the trace of I/O commands.

6. The method of claim 5, wherein the first and second data storage system are the same data storage system.

7. A system for having a workload scenario accessed and played in a data storage environment, the system comprising:
- a first data storage system with physical data storage devices that are included with the first data storage system;
- at least one host computer in communication with the first data storage system and which communicates I/O commands to the first data storage system;
- a second data storage system; and
- a computer system for cooperating with the first and second data storage system for accessing a trace of workload activity experienced on one or more data storage volumes representing data stored on the physical data storage devices that are included with the first data storage system for playing a replication of the trace of I/O commands on one or more data storage volumes representing data stored on physical data storage devices that are included with a second data storage system wherein the playing of the trace I/O commands includes analyzing the trace of I/O commands activity and creating replay I/O commands from the trace of I/O commands that can be replayed on the second data storage system.

8. The system of claim 7, wherein the replay I/O commands includes one or more time notations indicating a time-relation for I/O commands that occurred during the access of the trace of I/O commands.

9. The system of claim 8, wherein the one or more time notations are used for replaying the I/O commands so that the replay is timed in accordance with the one or more timing notations.

10. A program product for having a workload scenario accessed and played in a data storage environment, the program product including a computer readable medium with program logic configured for causing the following computer-executed steps to occur:
- accessing a trace of I/O commands from a host computer to a first data storage system that are experienced on one or more data storage volumes that represent data stored on physical storage devices that are included with a first data storage system;
- cooperating with a second data storage system for playing a replication of the trace of I/O commands on one or more data storage volumes that represent data stored on physical storage devices that are included with a second data storage system, and wherein the playing of the trace includes analyzing the trace of I/O commands and creating replay I/O commands from the trace of I/O commands that can be replayed on the second data storage system.

* * * * *

UNITED STATES PATENT AND TRADEMARK OFFICE
CERTIFICATE OF CORRECTION

PATENT NO.      : 6,775,826 B1
DATED           : August 10, 2004
INVENTOR(S)     : William Zahavi et al.

It is certified that error appears in the above-identified patent and that said Letters Patent is hereby corrected as shown below:

Title page,
Item [75], Inventors, "Kenneth R. Coguen" should read -- Kenneth R. Goguen --.

Signed and Sealed this

Third Day of May, 2005

JON W. DUDAS
*Director of the United States Patent and Trademark Office*